US007437165B2

(12) United States Patent
Burgess et al.

(10) Patent No.: US 7,437,165 B2
(45) Date of Patent: Oct. 14, 2008

(54) METHOD OF APPLYING HASHING ALGORITHMS IN A WIRELESS COMMUNICATION SYSTEM

(75) Inventors: John K Burgess, Morristown, NJ (US); Carol M. Picot, Boonton Township, Morris County, NJ (US); David Albert Rossetti, Randolph, NJ (US); Lily H Zhu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1100 days.

(21) Appl. No.: 10/609,728

(22) Filed: Jun. 30, 2003

(65) Prior Publication Data

US 2004/0266445 A1    Dec. 30, 2004

(51) Int. Cl.
*H04Q 7/20* (2006.01)
(52) U.S. Cl. .................................. 455/450; 455/452.1
(58) Field of Classification Search ................ 455/403, 455/419, 422, 432–434, 512, 566, 154.1, 455/161.1, 450, 452.1, 452.2, 453
See application file for complete search history.

(56) References Cited

U.S. PATENT DOCUMENTS

| 5,920,821 | A | * | 7/1999 | Seazholtz et al. ........... 455/466 |
| 6,044,265 | A | * | 3/2000 | Roach, Jr. ................... 455/419 |
| 6,246,875 | B1 | * | 6/2001 | Seazholtz et al. ......... 455/432.1 |
| 6,385,455 | B1 | * | 5/2002 | St. Clair et al. ............. 455/450 |

FOREIGN PATENT DOCUMENTS

WO    WO 98/47238    10/1998

OTHER PUBLICATIONS

Allen He, "Performance Comparison of Load Balancing Methods in Multiple Carrier CDMA Systems," *IEEE*, vol. 1, (Sep. 18, 2000), pp. 113-118.
Bongyong Song, et al, "Performance Analysis of Channel Assignment Methods for Multiple Carrier CDMA Cellular Systems," *Vehicular Technology Conference, 1999 IEEE 49th* Houston, TX, USA May 16-20, 1999, Piscataway, NJ, May 16, 1999, pp. 10-14.
European Search Report.

* cited by examiner

*Primary Examiner*—Binh K Tieu

(57) ABSTRACT

A method of wireless communication. The method includes the step of broadcasting a message, such as channel list message, for example. The broadcasting message lists each available carrier for each available frequency band in the wireless communication spectrum—e.g., 400 MHz and about 2100 MHz. Each available carrier listed within the message may correspond with at least one cell of a coverage area. Moreover, each broadcast message comprises at least one occurrence for each available carrier. Each available carrier may also be repeated within the message a number of times corresponding to a carrier weighting. This carrier weighting in turn corresponds with a traffic load. Alternatively, the method may also include the step of repeating the broadcast of the message a number of times, wherein the number corresponds to a carrier weighting associated with the traffic load. The broadcast message may also comprise a listing of at least one service, such as voice and/or data, supported by each available carrier.

23 Claims, 3 Drawing Sheets

METHOD OF APPLYING HASHING ALGORITHMS IN A WIRELESS COMMUNICATION SYSTEM

FIELD OF THE INVENTION

This invention relates to telecommunications and, more particularly, to wireless communications.

BACKGROUND OF THE INVENTION

Wireless communications systems provide wireless service to a number of wireless or mobile units situated within a geographic region. The geographic region supported by a wireless communications system is divided into spatially distinct areas commonly referred to as "cells." Each cell, ideally, may be represented by a hexagon in a honeycomb pattern. In practice, however, each cell may have an irregular shape, depending on various factors including the topography of the terrain surrounding the cell. Moreover, each cell is further broken into two or more sectors. Each cell is commonly divided into three sectors, each having a range of 120 degrees, for example.

A conventional cellular system comprises a number of cell sites or base stations geographically distributed to support the transmission and reception of communication signals to and from the wireless or mobile units. Each cell site handles voice and/or data communications within a cell. Moreover, the overall coverage area for the cellular system may be defined by the union of cells for all of the cell sites, where the coverage areas for nearby cell sites overlap to ensure, where possible, contiguous communication coverage within the outer boundaries of the system's coverage area.

Each base station comprises at least one radio and at least one antenna for communicating with the wireless units in that cell. Moreover, each base station also comprises transmission equipment for communicating with a Mobile Switching Center ("MSC"). A mobile switching center is responsible for, among other things, establishing and maintaining calls between the wireless units, between a wireless unit and a wireline unit through a public switched telephone network ("PSTN"), as well as between a wireless unit and a packet data network ("PDN"), such as the Internet. A base station controller ("BSC") administers the radio resources for one or more base stations and relays this information to the MSC.

When active, a wireless unit receives signals from at least one base station over a forward link or downlink and transmits signals to at least one base station over a reverse link or uplink. Several approaches have been developed for defining links or channels in a cellular communication system, including time division multiple access ("TDMA"), frequency division multiple access ("FDMA"), orthogonal frequency division multiple access ("OFDMA") and code division multiple access ("CDMA"), for example.

Wireless communication is supported by an increasing number of frequency bands in the RF spectrum. At least 10 frequency bands ranging from about 450 MHz to about 2000 MHz have presently been allocated for wireless cellular communication. The rights to use carrier frequencies within each band of this spectrum have been awarded historically to wireless service providers by governmental bodies, such as the Federal Communications Commission in the United States, for example, through mostly auction. Over the past decade, however, a number of wireless service providers have merged and/or acquired. Consequently, a smaller number of larger wireless service providers exist today some of which own successor rights to a number of carrier frequencies in a number of frequency bands.

Presently, each base station supporting CDMA technology, for example, may transmit at least one (e.g., a set) overhead message over the paging channel. These overhead messages provide each potential wireless unit with a suite of information including a channel list message and/or an extended channel list message. The channel list message lists the availability of carriers in a single frequency band. In response, the wireless unit may select an available carrier in a single frequency band listed in the channel list message randomly using a hashing algorithm. Since support for a given frequency band by a wireless unit may be optional, the wireless unit may select a different carrier depending on the set of frequency bands supported thereby.

For example, wireless technology standard IS-2000 calls for a hashing algorithm to enable a wireless system supporting multiple carriers to achieve statistical load-balancing and maximize system capacity without compromising performance. The hashing algorithm may be employed to uniformly distribute wireless access across a number of carrier frequencies within a single band. The uniform distribution of wireless access may be derived from the number of carriers listed in the channel list message, as well as an identifier for each wireless unit.

The existing applications of hashing algorithms, however, have a number of limitations. Firstly, hashing algorithms may not be applied to wireless access over a number of carriers over multiple frequency bands. As a consequence, multi-carrier load balancing may be more difficult to realize in cell sites supporting more than one frequency band. Moreover, hashing algorithms may not be applied to support steering types of services, such as voice or data, for example, or identified wireless units to a desired carrier(s). Hashing algorithms may not also support a uniform distribution of carrier usage based on the services supported by each available carrier.

Consequently, a need exists of enhancing the application of hashing algorithms in wireless communication systems. A demand exists for a method of applying a hashing algorithm to wireless access over a number of carriers over multiple frequency bands. A need further exists for a method of applying a hashing algorithm to support steering wireless access to a desired frequency carrier(s) based on traffic and/or system load or volume, types of services, and/or wireless unit identification. There also exists a demand for a method of applying a hashing algorithm that supports a uniform distribution of carrier usage based on the services supported by each available carrier.

SUMMARY OF THE INVENTION

The present invention provides a method of enhancing the application of hashing algorithms in wireless communication systems. More particularly, the present invention increases the efficient utilization of multiple carriers across multiple frequency bands supported by a single service provider. The present invention provides a method of applying a hashing algorithm to wireless access over a number of carriers over multiple frequency bands. Moreover, the present invention provides a method of applying a hashing algorithm to support steering wireless units to a desired frequency carrier(s) based on traffic and/or system load, types of services, and/or wireless unit identification, for example. The present invention also provides a method of applying a hashing algorithm that supports a uniform distribution of carrier usage based on the services supported by each available carrier.

In one embodiment, the method includes broadcasting a message listing each available carrier for each available frequency band. For the purposes of the present disclosure, a broadcast message listing may refer to a message listing of each channel and each carrier available for each frequency band. Each wireless unit receiving the broadcasting message may select a carrier from a potential plurality of carriers over at least one frequency band. This carrier selection may, over time, support a uniform distribution amongst a plurality of available carriers for each available frequency band of wireless units seeking access to the network.

In another embodiment, the method includes the step of broadcasting a message listing each available carrier for each available frequency band in the wireless communication spectrum—e.g., 400 MHz and about 2100 MHz. Each available carrier listed within the message may correspond with at least one cell of a coverage area. Moreover, each broadcast message comprises at least one occurrence for each available carrier. Each available carrier may also be repeated within the message a number of times corresponding to a carrier weighting. This carrier weighting may, in turn, correspond with a traffic load, for example. Alternatively, each available carrier in the broadcast message listing may include a weighting number corresponding with the carrier weighting, which may be associated with traffic load, for example. This weighting number may correspond with the number of times each available carrier is available, as opposed to repeating each available carrier. The broadcast message may also comprise a listing of at least one service, such as voice and/or data, supported by each available carrier.

In still another embodiment, the method includes the step of receiving a broadcast message listing each available carrier for each available frequency band in the wireless communication spectrum in the wireless communication spectrum—e.g., 400 MHz and about 2100 MHz. The received broadcast message may correspond with at least one cell of a coverage area. Each broadcast message may comprise at least one occurrence for each available carrier. The wireless unit may then perform a hashing algorithm to select one of the available carriers listed in the received message and begin transmitting voice and/or data over the selected carrier. Each available carrier may be repeated within the received broadcast message a number of times corresponding to a carrier weighting. This carrier weighting may, in turn, correspond with a traffic load. Alternatively, each available carrier in the broadcast message listing received may include a weighting number corresponding with the carrier weighting, which may be associated with traffic load, for example. This weighting number may correspond with the number of times each available carrier is available, as opposed to repeating each available carrier. The received broadcast message may also comprise a listing of at least one service, such as voice and/or data, supported by each available carrier.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method of enhancing the application of hashing algorithms in wireless communication systems. More particularly, the present invention increases the efficient utilization of multiple carriers across multiple frequency bands supported by a single service provider. The present invention provides a method of applying a hashing algorithm to wireless access over a number of carriers over multiple frequency bands. Moreover, the present invention provides a method of applying a hashing algorithm to support steering wireless units to a desired frequency carrier(s) based on traffic and/or system load, types of services, and/or wireless unit identification, for example. The present invention also provides a method of applying a hashing algorithm that supports a uniform distribution of carrier usage based on the services supported by each available carrier.

Figure 1:
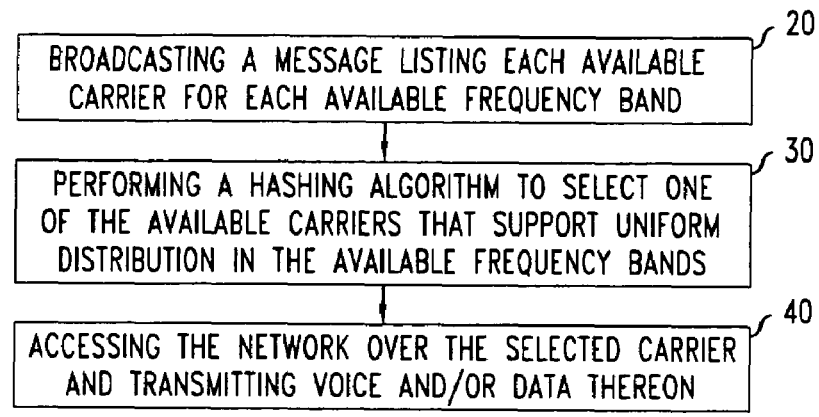
FIG. 1 depicts an embodiment of the present invention.

Referring to FIG. 1, a flow chart depicting one embodiment of the present invention is illustrated. More particularly, a method (10) is depicted for applying a hashing algorithm to wireless access over a number of carriers over multiple frequency bands. For the purposes of the present disclosure, a hashing algorithm may refer to a random process in the selection of a carrier to support the uniform distribution over time amongst a plurality of available carriers for each available frequency band of wireless units seeking access to the network through at least one cell in a coverage area.

The method (10) initially broadcasts a message listing each available carrier for each available frequency band (step 20). For the purposes of the present disclosure, a broadcast message listing may refer to a message listing of each channel and each carrier available for each frequency band. Here, the availability of each carrier of each frequency band assigned to the base station is now broadcast to potential wireless units seeking access to the network. Therefore, if a base station has two-frequency band capability and two carriers with in each frequency band, the broadcast message listing should include a recitation of four carriers—two carriers for each of the two frequency bands.

The message listing broadcasted may be part of at least one overhead message. For example, message listing may be realized by the channel list message. Moreover, this message listing may be transmitted over the paging channel or the broadcast control channel, for example, by base stations.

Wireless units seeking access to the network may subsequently receive the broadcast message listing. Having at its disposal each of the available carriers for each of the available frequency bands, each wireless unit may support a more uniform distribution of carrier usage over time. Here, the method (10) performs a hashing algorithm (step 30) to select one of the available carriers based on the broadcast message listing. Other considerations in the step of performing a hashing algorithm (step 30) include the wireless unit's identification, identification number, as well as the capabilities of the wireless unit. This selection supports the uniform distribution amongst a plurality of available carriers. Wireless units may hash over supported carriers—e.g., a carrier on a non-supported band may not be selected. Once a carrier has been selected through a hashing algorithm operation, each wireless unit may then access the network over the selected carrier and begin transmit voice and/or data over the selected carrier (step 40). It should be noted that, alternatively, access or be requested to access the network may be realized using the selected carrier, while the transmission of voice or data may utilize a different carrier.

The present embodiment may simplify and provide improved efficiency in the selection of carriers over multiple frequency bands. For example, tri-mode wireless units (e.g., cellular phones) have recently become commercially standard in the United States. Tri-mode wireless units are capable of supporting multiple frequency bands. Thusly, tri-mode wireless units support the analog cellular band at about 850 MHz, digital cellular band at about 850 MHz and digital PCS band at about 1900 MHz. Presently, these tri-mode wireless units are, nonetheless, designated to operate within one preferred band of operation by service providers. Thusly, a tri-mode wireless unit may currently look to the carriers associated with the preferred band of operation only, as recited on the carrier list message, to gain access to the wireless network. If, however, the tri-mode wireless unit finds the carriers associated with its preferred band fully loaded and access denied, the tri-mode wireless unit must wait for a base station to transmit a mobile direct message ("MDM"). This MDM may not be broadcast, but transmitted directly to the relevant tri-mode phone, for example. As such, the MDM may require load-dependent system resources, and thusly, may introduce additional delay(s) in providing service to the wireless unit.

By means of the present embodiment, however, a tri-mode wireless unit seeking access to the wireless network should receive a broadcast message reciting each available carrier over each available frequency band. By this broadcast message, a tri-mode wireless unit should have information regarding the availability of each carrier beyond its designated or preferred band of operation. Consequently, with multiple band carrier availability information at its disposal, a tri-mode wireless unit may perform a hashing algorithm, thereby reducing or potentially eliminating the need for an MDM and supporting the uniform distribution amongst the plurality of available carriers for each available frequency band.

Figure 2:
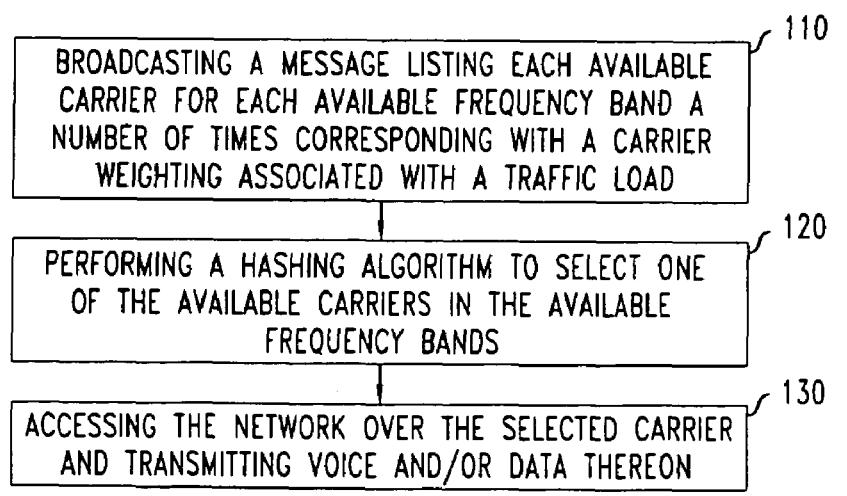
FIG. 2 depicts another embodiment of the present invention

Referring to FIG. 2, a flow chart depicting another embodiment of the present invention is illustrated. More particularly, a method (100) is depicted for applying a hashing algorithm to support steering to a desired frequency carrier(s). For the purposes of the present disclosure, steering may refer to directing traffic to a particular carrier by taking traffic load and/or volume over each carrier. It should be apparent that steering might also be applied to types of services in use or in demand, and/or to an identified wireless unit(s).

The method (100) initially broadcasts a message listing each available carrier for each available frequency band (step 110). The availability of each carrier of each frequency band assigned to the base station is now broadcast to potential wireless units seeking access to the network. Unlike the embodiment corresponding with FIG. 1, each available carrier here may be repeated a number of times within the broadcast message listing. The repetition of each available carrier is intended to correspond with traffic load by means of a carrier weighting. Thusly, the carrier weighting for a carrier experiencing a light traffic load may cause it to be repeated a relatively larger number of times in the broadcast message than a carrier experiencing a heavy traffic load, for example. However, it should be noted that carrier weighting might incorporate other factors, solely or collectively, including the types of services in use or in demand, and/or to an identified wireless unit(s).

Wireless units seeking access to the network may subsequently receive the broadcast message listing reciting each available carrier for each available frequency band. In accordance with this embodiment, each available carrier may be repeated within the broadcast message listing according to a carrier weighting. Having this information at its disposal, each wireless unit may now support a relatively instantaneous uniform distribution of carrier usage.

The method (100) performs a hashing algorithm (step 120) to select one of the available carriers based on the broadcast message listing. As the carrier weighting may steer wireless access to an available carrier with lighter traffic load or volume, carrier selection supports the uniform distribution amongst a plurality of available carriers in relative real time. Once a carrier has been selected through a hashing algorithm operation, each wireless unit may then access the network over the selected carrier and begin transmit voice and/or data over the selected carrier (step 130). It should be noted that, alternatively, access or be requested to access the network may be realized using the selected carrier, while the transmission of voice or data may utilize a different carrier.

In one scenario of the present embodiment, four users may be within the wireless network, with the first two users idle and associated with a first carrier and the second two users attempting to make calls. Here, the application of the hashing algorithm may attempt to uniformly distribute the carrier usage over time. However, this distribution is not balanced in real time. In this circumstance, where the load is unbalanced because too much traffic is associated with one carrier, the corresponding base station may transmit a traffic channel assignment ("TCA"). This TCA is intended to switch one or more wireless units from the overloaded carrier to the underloaded carrier(s) in a procedure commonly referred to a cross carrier assignment. However, employing a TCA to switch a user(s) between carriers may promote call set-up failure, call drops, latency issues and create RF problems.

By means of the present embodiment, it should not be necessary to use a TCA to move one or more users from an overloaded carrier to an underloaded carrier(s). By transmitting a broadcast message reciting each available carrier over each available band using a carrier weighting, the distribution of the carrier usage should be uniform in real time. In this manner, the wireless unit may be more likely to attempt to receive service on a carrier in the network that has the capacity to provide such a service. Consequently, the method of the present embodiment promotes load balancing.

Figure 3:
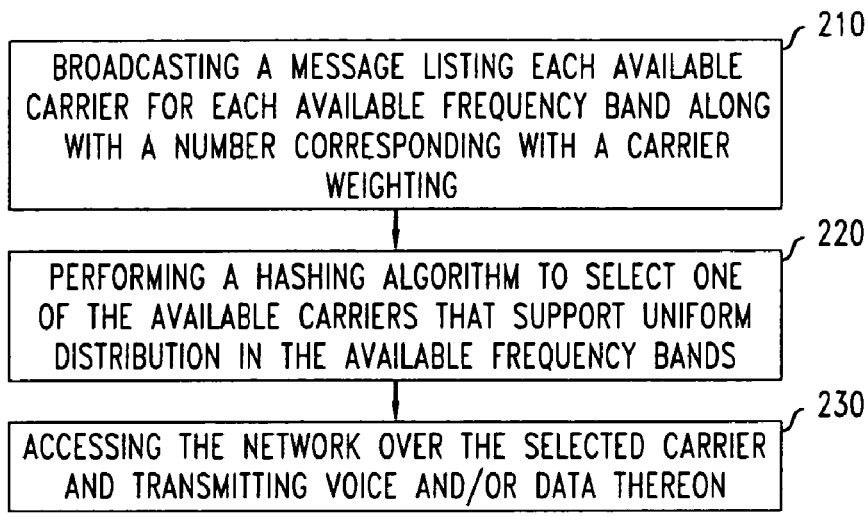
FIG. 3 depicts yet another embodiment of the present invention.

Referring to FIG. 3, a flow chart depicting another embodiment of the present invention is illustrated. More particularly, a method (200) is depicted for applying a hashing algorithm to support steering to a desired frequency carrier(s). As noted hereinabove, steering may refer to directing traffic to a particular carrier by taking traffic load/volume, types of services in use or in demand, and/or to an identified wireless unit(s), for example, into consideration individually or collectively.

Here, the method (200) of present embodiment broadcasts a message listing each available carrier for each available frequency band (step 210). The availability of each carrier of each frequency band assigned to the base station is now broadcast to potential wireless units seeking access to the network. Unlike the embodiment corresponding with FIG. 2, each available carrier in the broadcast message listing may include a weighting number corresponding with the carrier weighting associated with the traffic load/volume, for example. This weighting number may correspond with the carrier weighting, which may be associated with traffic load, for example. This weighting number may correspond with the number of times each available carrier is available, in place of repeating each available carrier in the method (100) corresponding with the embodiment of FIG. 2. Where a large number of carriers are employed, the embodiment corresponding with FIG. 2 may potentially be relatively long, single message listing. To avoid introducing a delay into the system, the method (200) provides for using at least one weighting number associated with each available carrier contained within the message. Thusly, the carrier weighting for a carrier experiencing a light traffic load may have a relatively smaller weighting number in comparison with a carrier experiencing a heavy traffic load, for example. As noted hereinabove, carrier weighting, and thusly, the weighting number might incorporate other factors, solely or collectively, including the types of services in use or in demand, and/or to an identified wireless unit(s).

Wireless units seeking access to the network may subsequently receive each broadcast message listing reciting each available carrier for each available frequency band. Wireless unit should receive a larger number of repeat message listings containing available carriers experiencing lighter traffic conditions, for example, and a fewer number of repeat message listings containing available carriers experiencing heavy traffic conditions. With this information at its disposal, each wireless unit may now support a relatively instantaneous uniform distribution of carrier usage.

The method (200) performs a hashing algorithm (step 220) to select one of the available carriers based on the repeated broadcast message listing. As the carrier weighting may steer wireless access to an available carrier with lighter traffic load or volume, carrier selection supports the uniform distribution amongst a plurality of available carriers in relative real time. Once a carrier has been selected through a hashing algorithm operation, each wireless unit may then access the network over the selected carrier and begin transmit voice and/or data over the selected carrier (step 230). It should be noted that, alternatively, access or be requested to access the network may be realized using the selected carrier, while the transmission of voice or data may utilize a different carrier.

Figure 4:
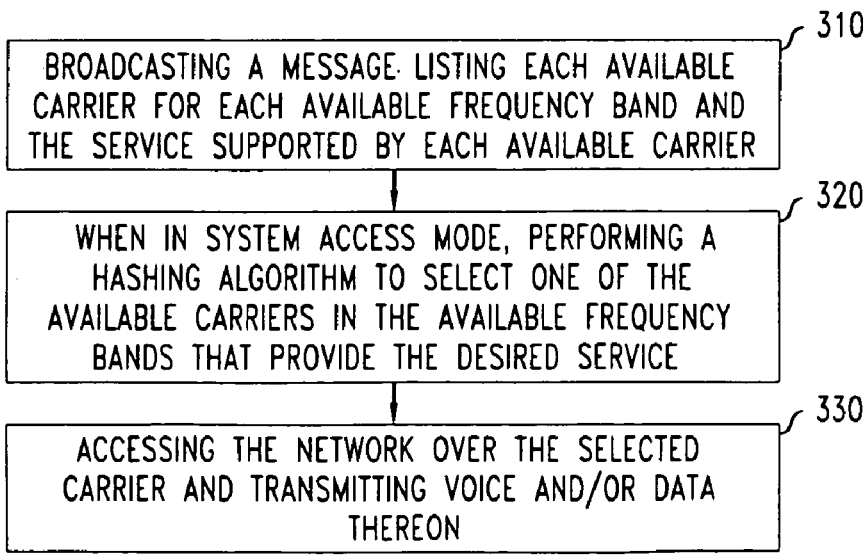
FIG. 4 depicts still another embodiment of the present invention.

Referring to FIG. 4, a flow chart depicting another embodiment of the present invention is illustrated. More particularly, a method (300) is depicted for applying a hashing algorithm supporting a uniform distribution of carrier usage based on the services supported by each available carrier. While each frequency band may have numerous carriers therein, each carrier may not support any type of service (e.g., voice or data) request. Consequently, amongst the available carrier within a frequency band, some carriers may support voice calls, some carriers may support data calls, and some carriers may support voice and/or data calls.

The method (300) initially broadcasts a message listing each available carrier for each available frequency band (step 310). Here, the availability of each carrier of each frequency band assigned to the base station is now broadcast to potential wireless units seeking access to the network. It should be noted that some services might require a different distribution than other services. For example, voice services may necessitate a first weighting given its priority over data services, which may have a second weighting associated thereto. Consequently, the message listing of method (300) may also include a services weighting number. The method (300) may accordingly utilize any number of the weighting schemes, including the embodiments associated with method (100) and method (200) detailed herein. Therefore, the broadcast message listing includes each available carrier in each available frequency band and the service(s) supported by each available carrier. By providing a broadcast message listing that includes the service(s) supported, the need for a TCA may be reduced or eliminated because the wireless unit may examine each available carrier within each band by the service(s) supported thereby. Previously, a TCA might be used to switch a wireless unit from one carrier to another carrier if no carriers were free to support the service sought by the user.

In one example, a base station has two-frequency band capability. One carrier is situated in each frequency band for voice. Moreover, one carrier is situated in each frequency band for data. Consequently, the broadcast message listing should include a recitation of four carriers and four services supported thereby. More particularly, the broadcast message should label one carrier in each frequency band as being voice, and label another carrier in each frequency band as being data.

Wireless units seeking access to the network may subsequently receive the broadcast message listing. Having at its disposal each of the available carriers for each of the available frequency bands and the service each carrier supports, each wireless unit may select an appropriate carrier based on the type of service requested. The selection of the appropriate carrier may support a uniform distribution of carrier usage based on the services supported by each available carrier.

Based on the broadcast message listing, the method (300) performs a hashing algorithm (step 320) to select one of the available carriers depending on the desired service. This selection supports the uniform distribution amongst a plurality of available carriers according to the service supported. The performance of the hashing algorithm may occur while the wireless unit is a system access mode of operation, as opposed to an idle mode.

As the service type required by a wireless unit may not be fixed but, rather, vary over time, the hashing algorithm and the message list used therefor may also necessitate modification. Typically, the hashing algorithm is performed in a wireless unit for an idle mode of operation. In so doing, the carrier on which the wireless unit may be reached by the network may be defined. The method (300) may perform a separate hashing algorithm immediately prior to accessing the network once the service type is determined.

Once a carrier has been selected through a hashing algorithm operation, each wireless unit may then access the network over the selected carrier. Thereafter, the wireless unit may begin transmit voice and/or data over the selected carrier (step 330). It should be noted that, alternatively, access or be requested to access the network may be realized using the selected carrier, while the transmission of voice or data may utilize a different carrier.

Figure 5:
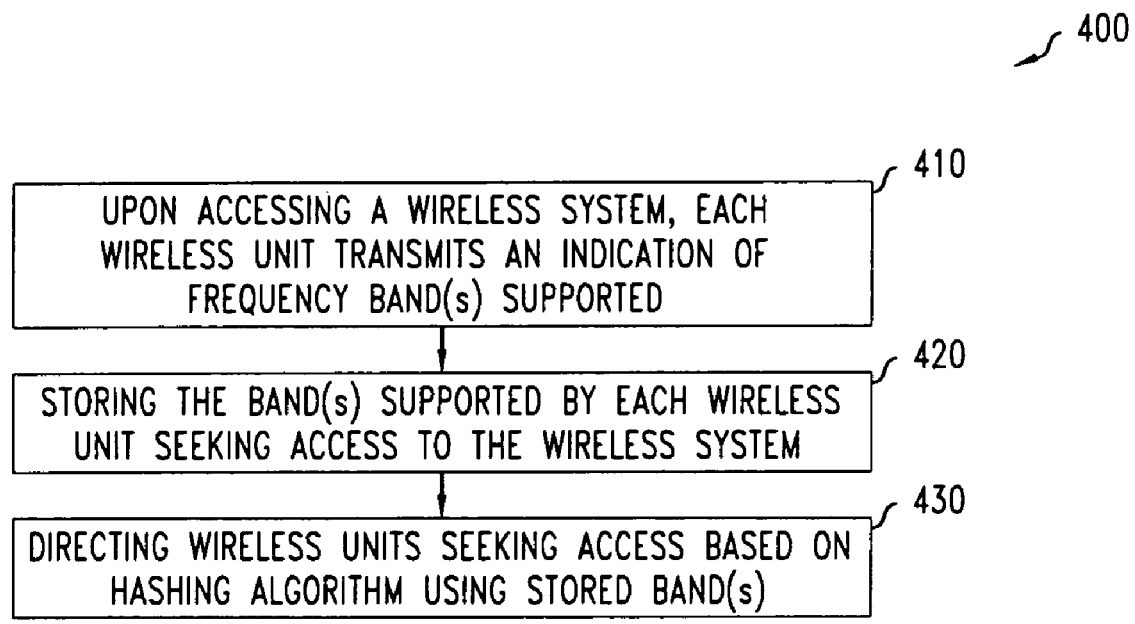
FIG. 5 depicts still another embodiment of the present invention.

Referring to FIG. 5, a flow chart depicting another embodiment of the present invention is illustrated. More particularly, a method (400) is depicted for the exchange of information between a wireless unit and at least one corresponding base station prior to the broadcast of a message list, as detailed herein. Initially, each wireless unit seeking access to the network transmits information indicating each frequency band(s) it supports (step 410). At this juncture, each wireless unit may be in an idle mode of operation while transmitting the band class(es) supported thereby.

Thereafter, at least one corresponding base station receives the transmission from each wireless unit seeking to access the network identifying each band(s) its supports. This information for each wireless unit is then stored by the base station (step 420). As a result, the base station may direct each wireless unit seeking access to the network to perform a hashing algorithm (step 430). This step of directing may take into consideration the band(s) supported by each wireless unit seeking access.

Exemplary Embodiments

Currently, various redirection/reassignment schemes may be employed, such as using Global Service Redirection message, Service Redirection Message, Channel Assignment message for paging channel assignment to re-distribute the idle mobiles. However, these schemes may have a negative impact on system performance due to delay, processing overhead, reprogramming of the mobiles, and traffic channel assignment failures, for example. Service providers may determine these mechanisms to be unsatisfactory to system operation and performance.

Support Cross Band Class Idle Hashing

One approach is to employ a new channel list message or expand the existing ECCLM to indicate channels in an alternate band class. Dual-band mobiles (e.g., tri-mode wireless units) may then use CCLM/ECCLM plus the new channel list message to perform hashing. The dual band mobiles could then be uniformly distributed between both band classes—the single band mobiles may ignore the new information and continue to be uniformly distributed within each band class. To support this function, the mobile may indicate band class support when registering, so the network knows where it may hash and may page the mobile on its idling carrier.

Support System Access Hashing Based On Call Type

Separate channel list messages may be used or new information included into the existing messages for each call type—e.g., one for voice calls and/or one for data calls. The content of the channel list messages may be designed differently. The mobiles that support these new channel list messages may choose which channel list message to use for hashing based on the call type. This may be referred to as system access hashing, where the mobile won't rehash until: (1) the user originates; or (2) the mobile may be paged. The base station may still page the mobile using the idle hashing algorithm. By this method, the network could achieve finer control of the voice and data traffic on each carrier without suffering the performance degradation normally seen when the assigned traffic carrier is different than the accessed carrier.

Support Weighted Idle Hashing

The existing hashing algorithm tries to uniformly distribute load evenly among the carriers. However, depending on the mobile distribution, as well as other factors within the network (e.g., cross-carrier assignment or 3G only carriers), the system load on one carrier may become more loaded than others. Should that occur, a lightly loaded carrier might be repeated multiple times in the CCLM/ECCLM. Alternatively, a lightly loaded carrier may be made to appear as if it had been repeated multiple times. As a consequence of either, however, more mobiles may likely gain access using that carrier.

Another example of the benefit of weighted hashing is to support different hardware configurations on carriers. If one carrier has more 3G hardware than another carrier, the ECCLM may have the carrier that has more 3G hardware appear multiple times to steer or drive more 3G mobiles to that carrier. To balance the overall load, the CCLM may have the other carrier(s) repeated.

To keep the channel list message from getting too long, however, the weighted approach may also be achieved by indicating, in the message itself, the number of occurrences, for the purpose of hashing, of each repeated carrier. There could be a different hashing replication number associated with each carrier for different types/classes of mobiles, including the number zero, if the carrier is to be omitted.

Support Preferred Carrier Idle Hashing

The existing ECCLM may provide the capability for 3G mobiles to hash to 3G-capable carriers. However, it may not provide the capability to let mobiles with certain capabilities hash to a preferred set of carriers. For example, if P_REV=11, the mobile may wish to hash to a set of P_REV=11 capable carriers, or a user with certain advanced feature may only want to hash to the carriers that has that capability. So for any optional feature, the base station may broadcast a feature set it supports and a separate channel list message that contains only the carriers that support them. In another example, 3G1X data-only mobiles, such as a laptop using wireless modem card, may want to access a set of data-preferred carriers. However, to direct page messages to the mobile on its hashed carrier, the base station may need to identify the mobile's capability and run its hashing algorithm accordingly.

Retrieve Mobile Capability Upon Registration

Currently, in the IS-2000 standard, some mobile capability may be retrieved via Status Request/Response message after the mobile is on the traffic channel. As a result, the base station may have no way of knowing mobile's capability before the mobile is on traffic channel. This may limit the base station's capability to hashing-based paging. Consequently, the following mobile capabilities may be included in the Registration message: band classes supported by the mobile; and data-only capability of the mobile. Accordingly, the base station may receive this information when mobile is in an idle state.

Support for Cross-System Hashing

If two systems made by different vendors are overlaid, a cross-system hashing may need to be automatically balanced. In so doing, mismatched hashing lists due to carrier outages and additional origination delays due to the Global Service redirection may be avoided. Consequently, the following additional fields might also be needed in the ANSI41 interface for each carrier: band class; carrier number; carrier weighting definitions; and carrier weightings.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of wireless communication comprising:
broadcasting a message listing configured to be hashed to determine at least one available carrier frequency, the message listing indicating each available carrier frequency for each of a plurality of available frequency bands in the wireless communication spectrum, each of the plurality of available frequency bands comprising a plurality of carrier frequencies, and the plurality of available frequency bands being supported by a single service provider.

2. The method of claim 1, wherein the message listing each available carrier frequency corresponds with at least one cell of a coverage area.

3. The method of claim 2, wherein the message comprises a channel list message.

4. The method of claim 2, wherein the wireless communication spectrum comprises frequency bands between about 400 MHz and about 2100 MHz.

5. The method of claim 2, wherein each available carrier frequency is repeated within the message a number of times, the number corresponding to a carrier weighting.

6. The method of claim 5, wherein the carrier weighting corresponds with a traffic load.

7. The method of claim 2, wherein the message broadcast comprises a weighting number associated with each available carrier frequency, each weighting number corresponding with carrier weighting.

8. The method of claim 7, wherein the carrier weighting corresponds with a traffic load.

9. The method of claim 7, wherein each broadcast message comprises at least one occurrence for each available carrier frequency.

10. The method of claim 2, wherein the message comprises a listing of at least one service supported by each available carrier frequency.

11. The method of claim 10, wherein the at least one service comprises at least one of voice and data.

12. A method of wireless communication comprising:
receiving a broadcast message listing configured to be hashed to determine at least one available carrier frequency, the broadcast message listing indicating each available carrier frequency for each of a plurality of available frequency bands in the wireless communication spectrum, each of the plurality of available frequency bands comprising a plurality of carrier frequencies, and the plurality of available frequency bands being supported by a single service provider.

13. The method of claim 12, wherein the broadcast message listing each available carrier frequency corresponds with at least one cell of a coverage area.

14. The method of claim 13, comprising:
performing a hashing algorithm to select one of the available carrier frequencies.

15. The method of claim 14, comprising:
transmitting at least one of voice and data over the selected carrier frequency.

16. The method of claim 12, wherein the received broadcast message listing comprises a channel list message.

17. The method of claim 12, wherein the wireless communication spectrum comprises frequency bands between about 400 MHz and about 2100 MHz.

18. The method of claim 12, wherein each available carrier frequency is repeated within the received broadcast message listing a number of times, the number corresponding to a carrier weighting.

19. The method of claim 18, wherein the carrier weighting corresponds with a traffic load.

20. The method of claim 12, wherein the received message listing comprises a weighting number associated with each available carrier frequency, each weighting number corresponding with carrier weighting.

21. The method of claim 20, wherein the carrier weighting corresponds with a traffic load.

22. The method of claim 12, wherein the message listing comprises a listing of at least one service supported by each available carrier.

23. The method of claim 22, wherein the at least one service comprises at least one of voice and data.

* * * * *